(12) United States Patent
Mukai et al.

(10) Patent No.: US 10,167,953 B2
(45) Date of Patent: Jan. 1, 2019

(54) VEHICULAR PARKING LOCK DEVICE

(71) Applicant: HONDA MOTOR CO., LTD., Tokyo (JP)

(72) Inventors: Tomoaki Mukai, Wako (JP); Shunsuke Yoshida, Wako (JP); Yuya Tachibanada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 162 days.

(21) Appl. No.: 15/124,582

(22) PCT Filed: Jan. 16, 2015

(86) PCT No.: PCT/JP2015/051065
§ 371 (c)(1),
(2) Date: Sep. 8, 2016

(87) PCT Pub. No.: WO2015/151550
PCT Pub. Date: Oct. 8, 2015

(65) Prior Publication Data
US 2017/0016534 A1    Jan. 19, 2017

(30) Foreign Application Priority Data

Mar. 31, 2014  (JP) ................................. 2014-073498

(51) Int. Cl.
*F16H 63/34* (2006.01)
*F16H 61/22* (2006.01)
(Continued)

(52) U.S. Cl.
CPC ......... *F16H 63/3483* (2013.01); *F15B 1/027* (2013.01); *F16H 61/22* (2013.01);
(Continued)

(58) Field of Classification Search
CPC .. F16H 63/3483; F16H 63/34; F16H 63/3425; F15B 1/027
See application file for complete search history.

(56) References Cited

U.S. PATENT DOCUMENTS

| | | | |
|---|---|---|---|
| 8,931,612 B2 * | 1/2015 | Bauer | ................. F16H 63/3483 192/219.5 |
| 9,080,666 B2 | 7/2015 | Berger et al. | |

(Continued)

FOREIGN PATENT DOCUMENTS

| | | |
|---|---|---|
| CN | 101451607 A | 6/2009 |
| CN | 103486243 A | 1/2014 |

(Continued)

OTHER PUBLICATIONS

International Search Report dated Apr. 21, 2015, issued in counterpart International Application No. PCT/JP2015/051065 (2 pages).

(Continued)

*Primary Examiner* — Stacey A Fluhart
(74) *Attorney, Agent, or Firm* — Westerman, Hattori, Daniels & Adrian, LLP

(57) ABSTRACT

In a vehicular parking lock device, the parking lock is actuated when a line pressure is supplied to a left end of a hydraulic actuator (25) via a second solenoid valve (32A), or a hydraulic pressure of an accumulator (37, 38) is supplied to the left end of the hydraulic actuator (25) via a third solenoid valve (32B), and the parking lock is released when a line pressure is supplied to a right end of the hydraulic actuator (25) via a first solenoid valve (32C, 32D). The second solenoid valve (32A) and the first solenoid valve (32D) also function as a solenoid valve that supplies the hydraulic pressure to a torque converter (40) and a solenoid valve that supplies the hydraulic pressure to a hydraulic brake (41) for shift change, respectively. Thus, it is possible (Continued)

to decrease the total number of solenoid valves, thereby cutting the number of components of a hydraulic circuit (31).

11 Claims, 7 Drawing Sheets

(51) Int. Cl.
    *F16H 61/30*      (2006.01)
    *F15B 1/027*      (2006.01)
    *F16H 45/02*      (2006.01)

(52) U.S. Cl.
    CPC ............. *F16H 61/30* (2013.01); *F16H 63/34* (2013.01); *F16H 63/3425* (2013.01); *F16H 45/02* (2013.01)

(56) References Cited

U.S. PATENT DOCUMENTS

| | | | |
|---|---|---|---|
| 9,205,813 | B2 * | 12/2015 | Yokota ................ F16H 63/3416 |
| 2003/0019702 | A1 | 1/2003 | Goedecke et al. |
| 2007/0283735 | A1 | 12/2007 | Schweiher et al. |
| 2009/0071275 | A1 * | 3/2009 | Yoshioka ................ B60T 1/005 |
| | | | 74/335 |
| 2011/0147141 | A1 * | 6/2011 | Schnittger ............. B60T 13/662 |
| | | | 188/152 |
| 2016/0341311 | A1 * | 11/2016 | Watanabe ........... F16H 63/3483 |
| 2016/0375880 | A1 * | 12/2016 | Farmer ................ B60T 8/1701 |
| | | | 701/50 |

FOREIGN PATENT DOCUMENTS

| | | |
|---|---|---|
| JP | 6-221422 | 8/1994 |
| JP | 2007-303680 A | 11/2007 |
| JP | 2008-503695 A | 2/2008 |
| JP | 2009-68588 A | 4/2009 |
| JP | 2013-213543 A | 10/2013 |

OTHER PUBLICATIONS

Office Action dated Apr. 18, 2017, issued in counterpart Chinese Application No. 201580011952.6. (5 pages).

\* cited by examiner

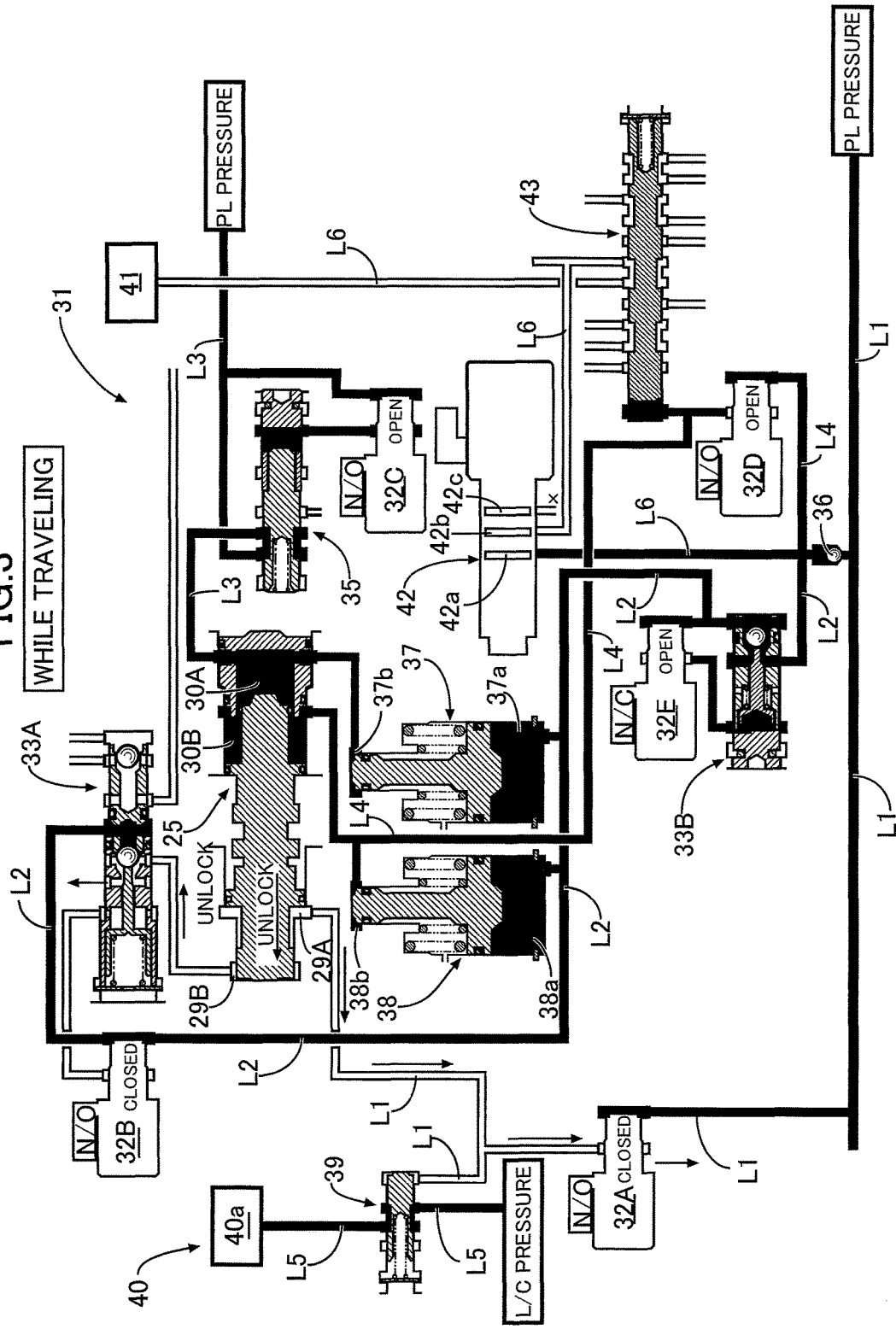

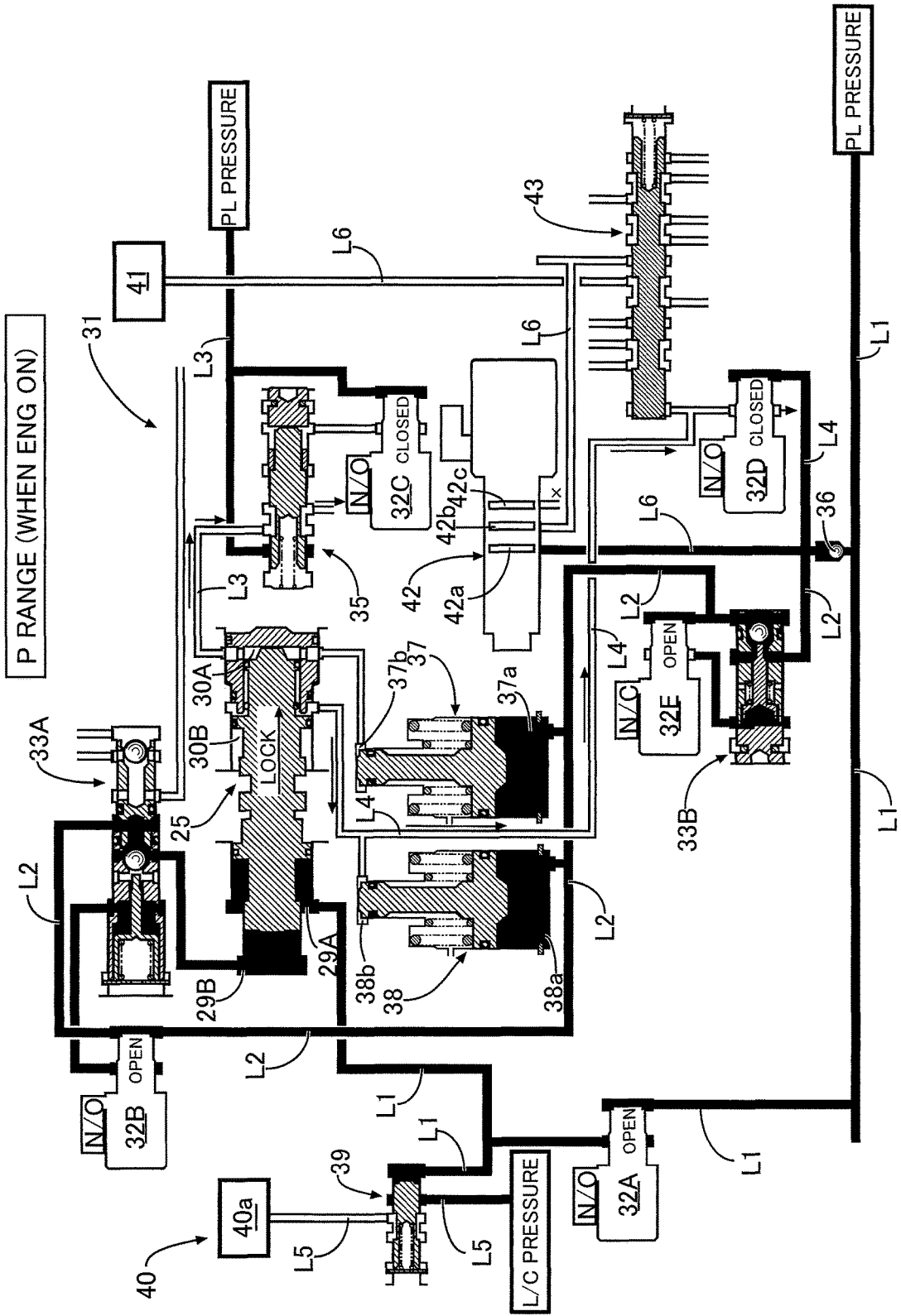
FIG.4 P RANGE (WHEN ENG ON)

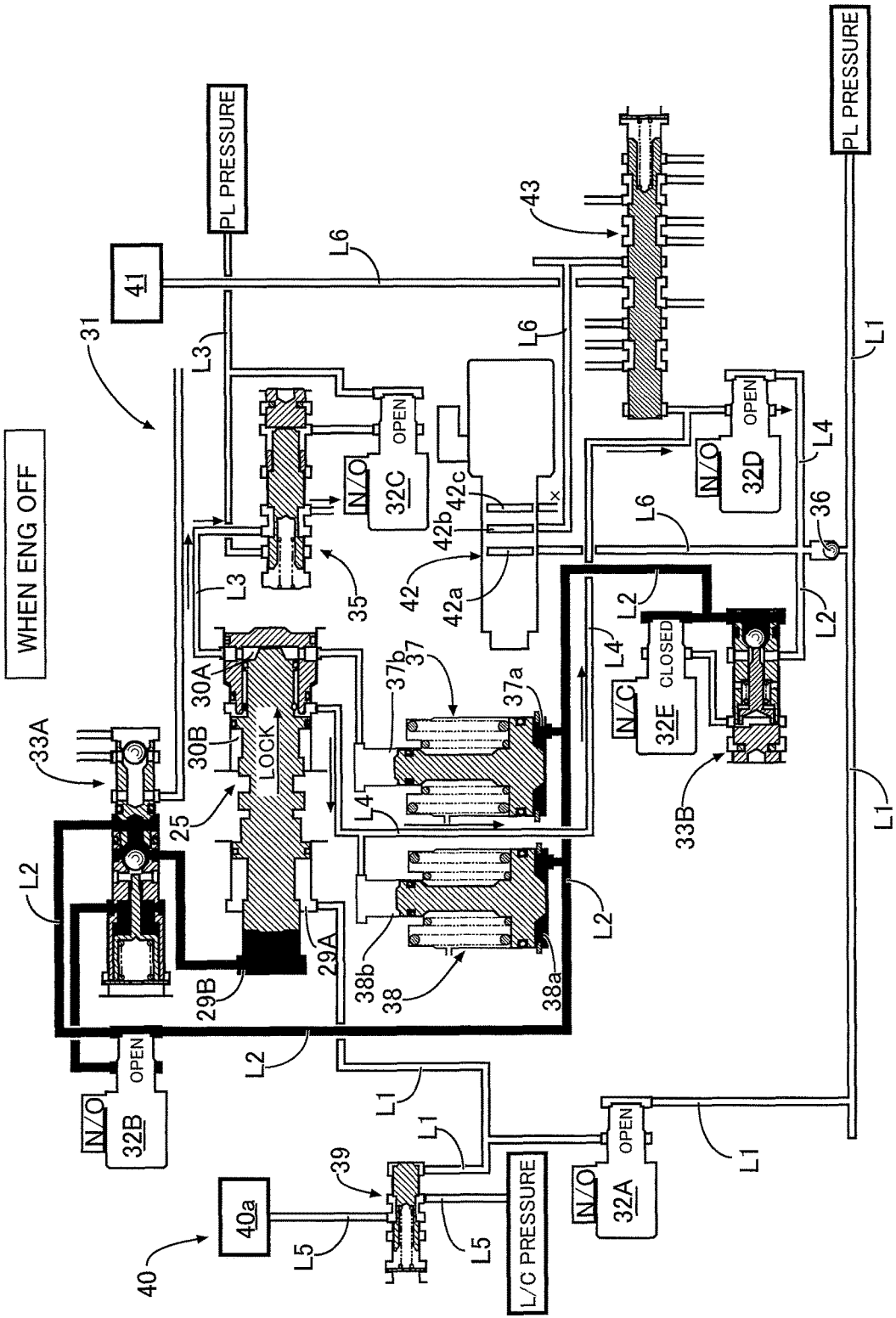

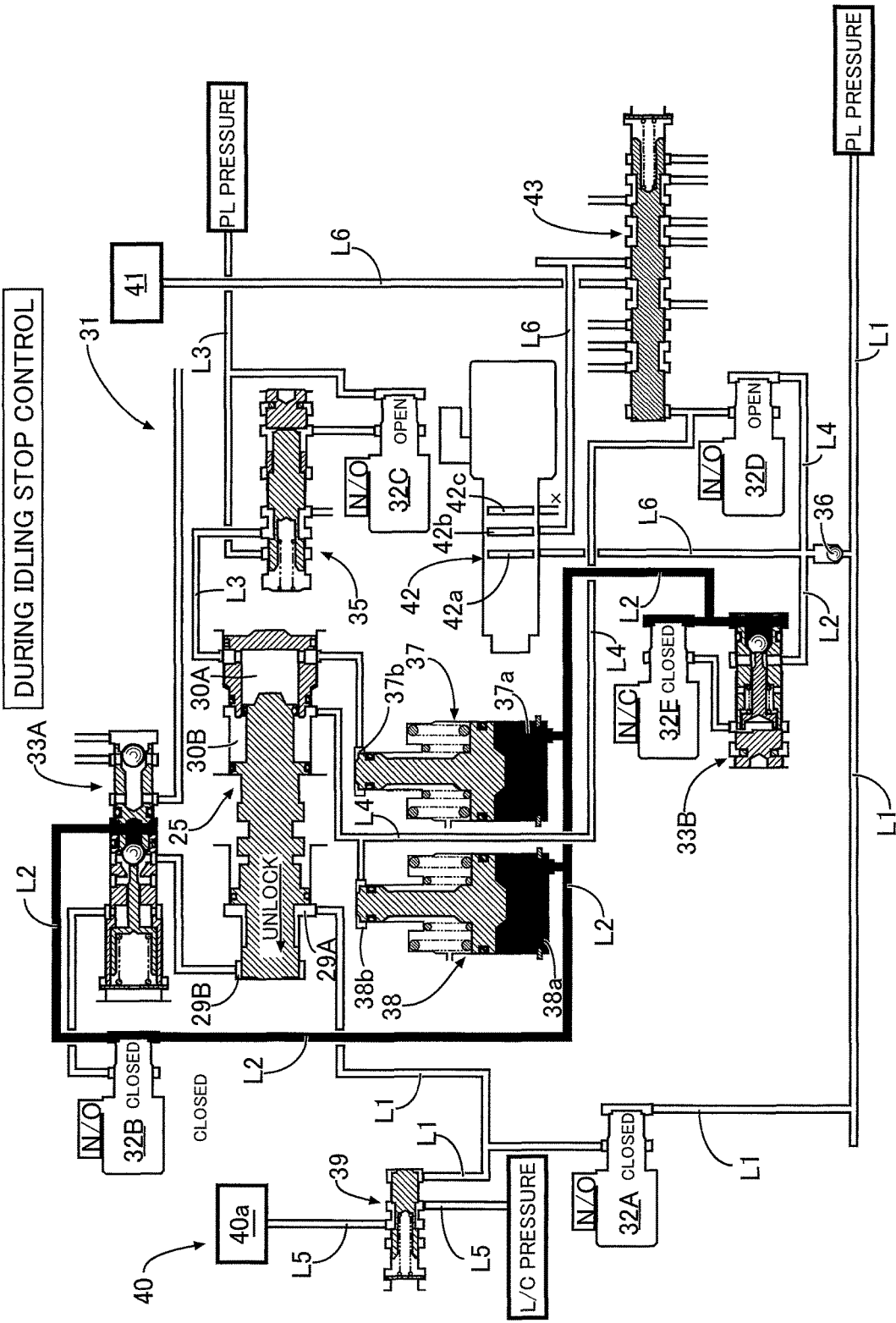

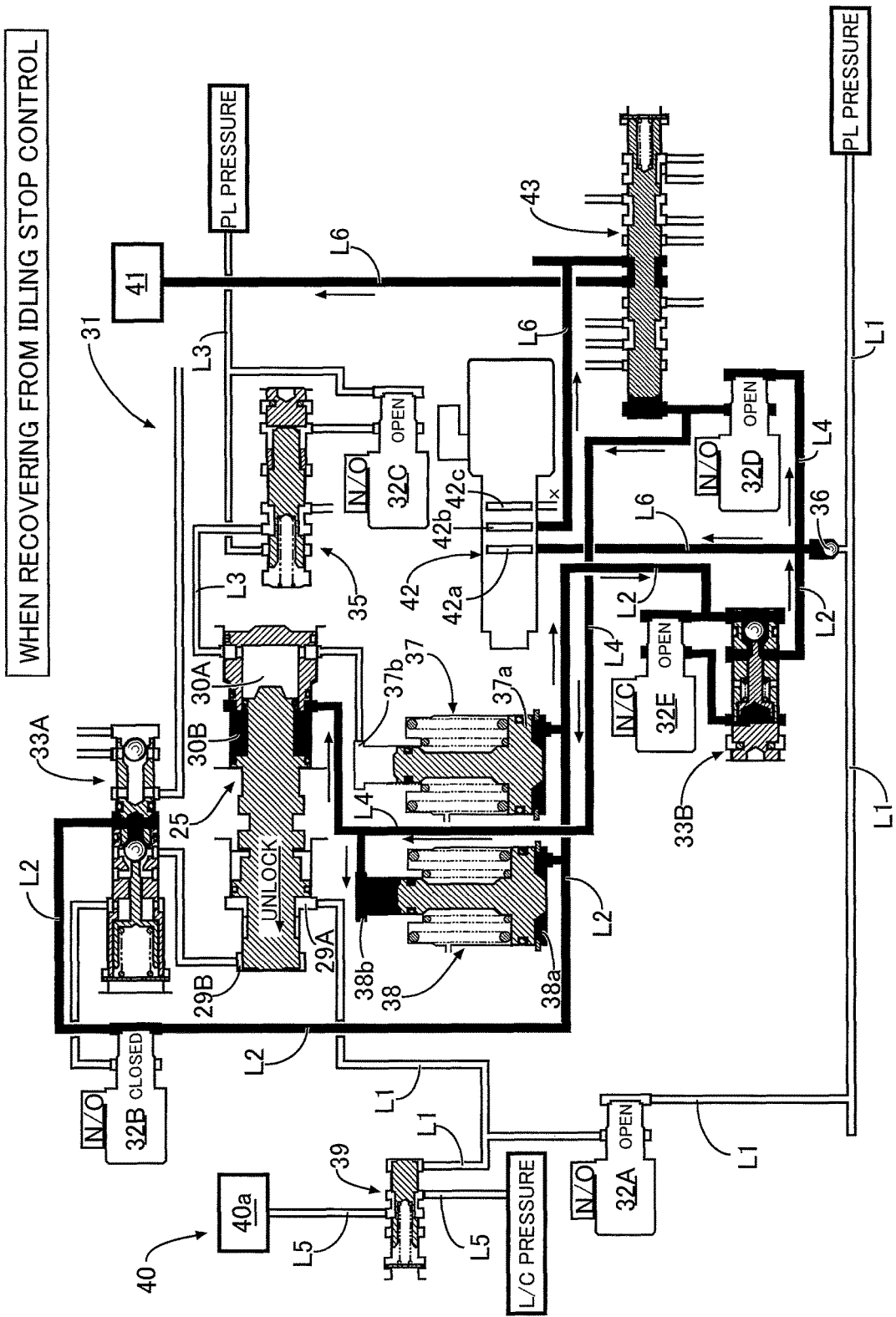

VEHICULAR PARKING LOCK DEVICE

TECHNICAL FIELD

The present invention relates to a vehicular parking lock device in which an automatic transmission that includes a starting mechanism and a plurality of hydraulic engagement devices and changes the speed of the driving force from a drive source and outputs the driving force includes a hydraulic actuator that can restrain rotation of a parking gear connected to a wheel and a hydraulic circuit that controls operation of the hydraulic actuator.

BACKGROUND ART

An arrangement in which a parking lock device for restraining rotation of an output shaft of an automatic transmission to thus prevent movement of a vehicle is operated by a hydraulic actuator that is operated by a hydraulic circuit is known from Patent Document 1 below.

RELATED ART DOCUMENTS

Patent Documents

Patent Document 1: Japanese Patent Publication No. 2008-503695

SUMMARY OF THE INVENTION

Problems to be Solved by the Invention

When the hydraulic circuit of the parking lock device is switched over to a parking lock operation position or a parking lock release position by supplying a hydraulic pressure selectively to one end or the other end of the hydraulic actuator via a plurality of solenoid valves, since a large number of solenoid valves are already used for the hydraulic circuit of the automatic transmission, it is not desirable to further increase the number of solenoid valves as a consequence of the parking lock device.

The present invention has been accomplished in light of the above circumstances, and it is an object thereof to cut the number of solenoid valves used for a hydraulic circuit of an automatic transmission equipped with a parking lock device.

Means for Solving the Problems

In order to attain the above object, according to a first aspect of the present invention, there is provided a vehicular parking lock device in which an automatic transmission that comprises a starting mechanism and a plurality of hydraulic engagement devices and changes a speed of a driving force from a drive source and outputs the driving force includes a hydraulic actuator that can restrain rotation of a parking gear connected to a wheel and a hydraulic circuit that controls operation of the hydraulic actuator, wherein the hydraulic circuit comprises a first solenoid valve that supplies a line pressure to one end of the hydraulic actuator in order to drive the hydraulic actuator to a parking lock release position, an accumulator in which a pressure is stored by the line pressure, a second solenoid valve that supplies the line pressure to the other end of the hydraulic actuator in order to drive the hydraulic actuator to a parking lock operation position, and a third solenoid valve that supplies a hydraulic pressure from the accumulator to the other end of the hydraulic actuator in order to drive the hydraulic actuator to the parking lock operation position, and the first solenoid valve or the second solenoid valve also functions as a solenoid valve that supplies the hydraulic pressure to the starting mechanism or a solenoid valve that supplies the hydraulic pressure to any one of the plurality of hydraulic engagement devices.

Further, according to a second aspect of the present invention, in addition to the first aspect, the drive source is an engine that is subjected to idling stop control at a time of deceleration of the vehicle, and the accumulator also functions as an accumulator that supplies the hydraulic pressure to any one of the plurality of hydraulic engagement devices when recovering from idling stop control.

Furthermore, according to a third aspect of the present invention, in addition to the first or second aspect, the starting mechanism is a torque converter equipped with a lockup clutch, and the second solenoid valve also functions as a solenoid valve that supplies the hydraulic pressure to the lockup clutch.

Moreover, according to a fourth aspect of the present invention, in addition to any one of the first to third aspects, the first solenoid valve comprises two solenoid valves, and a forward travel gear position first range established in the automatic transmission when one thereof supplies the line pressure to one end of the hydraulic actuator and a forward travel gear position second range established in the automatic transmission when the other thereof supplies the line pressure to the one end of the hydraulic actuator at least partially overlap one another.

Further, according to a fifth aspect of the present invention, in addition to the fourth aspect, provided on the other end side of the hydraulic actuator are a first locking oil chamber to which the hydraulic pressure is supplied via the second solenoid valve and a second locking oil chamber to which the hydraulic pressure is supplied via the third solenoid valve, and provided on the one end side of the hydraulic actuator are a first unlocking oil chamber to which the hydraulic pressure is supplied via one of the first solenoid valves and a second unlocking oil chamber to which the hydraulic pressure is supplied via the other one of the first solenoid valves.

Furthermore, according to a sixth aspect of the present invention, in addition to any one of the first to fifth aspects, the first to third solenoid valves are of a normally open type.

A solenoid valve 32A of an embodiment corresponds to the second solenoid valve of the present invention, a solenoid valve 32B of the embodiment corresponds to the third solenoid valve of the present invention, a solenoid valve 32C and a solenoid valve 32D of the embodiment correspond to the first solenoid valve of the present invention, a first accumulator 37 and a second accumulator 38 of the embodiment correspond to the accumulator of the present invention, a torque converter 40 of the embodiment corresponds to the starting mechanism of the present invention, and a hydraulic brake 41 of the embodiment corresponds to the hydraulic engagement device of the present invention.

Effects Of The Invention

In accordance with the first aspect of the present invention, the automatic transmission, which includes the starting mechanism and the plurality of hydraulic engagement devices and changes the speed of the driving force from the drive source and outputs it includes the hydraulic actuator, which can restrain the rotation of the parking gear connected to a wheel, and the hydraulic circuit, which controls operation of the hydraulic actuator.

When the line pressure is supplied from the first solenoid valve to one end of the hydraulic actuator, the hydraulic actuator is driven to the parking lock release position to thus release the parking lock, and when the line pressure is supplied from the second solenoid valve to the other end of the hydraulic actuator or the hydraulic pressure of the accumulator in which the line pressure is stored under pressure is supplied from the third solenoid valve to the other end of the hydraulic actuator, the hydraulic actuator is driven to the parking lock operation position to thus operate the parking lock.

Since the first solenoid valve or the second solenoid valve also functions as a solenoid valve that supplies hydraulic pressure to the starting mechanism or a solenoid valve that supplies hydraulic pressure to any one of the plurality of hydraulic engagement devices, it is possible to decrease the total number of solenoid valves, thus cutting the number of components of the hydraulic circuit.

Furthermore, in accordance with the second aspect of the present invention, since the drive source is an engine that is subjected to idling stop control at a time of deceleration of the vehicle, and the accumulator also functions as an accumulator that supplies hydraulic pressure to any one of the plurality of hydraulic engagement devices when recovering from idling stop control, it is possible to decrease the total number of accumulators, thus cutting the number of components of the hydraulic circuit.

Moreover, in accordance with the third aspect of the present invention, since the starting mechanism is the torque converter equipped with the lockup clutch, and the second solenoid valve also functions as a solenoid valve that supplies hydraulic pressure to the lockup clutch, it is possible to decrease the total number of solenoid valves, thus cutting the number of components of the hydraulic circuit.

Furthermore, in accordance with the fourth aspect of the present invention, since the first solenoid valve includes two solenoid valves, and the forward travel gear position first range established in the automatic transmission when one thereof supplies line pressure to one end of the hydraulic actuator and the forward travel gear position second range established in the automatic transmission when the other thereof supplies line pressure to the one end of the hydraulic actuator at least partially overlap one another, the line pressure is supplied from both of the two solenoid valves at the overlapping gear positions to one end of the hydraulic actuator.

Even when one of the two solenoid valves malfunctions and the line pressure cannot be supplied to one end of the hydraulic actuator, the above enables the redundancy for reliably preventing unnecessary operation of the parking lock to be ensured by retaining the hydraulic actuator at the parking lock release position with the line pressure supplied from the remaining one solenoid valve.

Moreover in accordance with the fifth aspect of the present invention, since provided on the other end side of the hydraulic actuator are the first locking oil chamber, to which hydraulic pressure is supplied via the second solenoid valve, and the second locking oil chamber, to which hydraulic pressure is supplied via the third solenoid valve, and provided on the one end side of the hydraulic actuator are the first unlocking oil chamber, to which hydraulic pressure is supplied via one of the two first solenoid valves, and the second unlocking oil chamber, to which hydraulic pressure is supplied via the other one of the two first solenoid valves, even if one of the second solenoid valve and the third solenoid valve malfunctions, the parking lock, can be operated, and even if one of the two first solenoid valves malfunctions, the parking lock can be released, thus enhancing the redundancy for malfunctioning of the solenoid valve.

Furthermore, in, accordance with the sixth aspect of the present invention, since the first to third solenoid valves are of a normally open type, even if the power supply malfunctions, it is possible to supply hydraulic pressure from the accumulator to the other end of the hydraulic actuator via any one of the open first to third solenoid valves, thus making the parking lock operate automatically.

BRIEF DESCRIPTION OF DRAWINGS

FIG. 3 is a diagram for explaining the operation when running in a D range or an R range (parking lock release). (first embodiment)

FIG. 4 is a diagram for explaining the operation when parking in a P range (engine ON) (parking lock operation). (first embodiment)

FIG. 5 is a diagram for explaining the operation when an engine is OFF (parking lock operation). (first embodiment)

FIG. 6 is a diagram for explaining the operation at a time of idling stop control. (first embodiment)

FIG. 7 is a diagram for explaining the operation when recovering from idling stop control. (first embodiment)

EXPLANATION OF REFERENCE NUMERALS AND SYMBOLS

Figure 1:
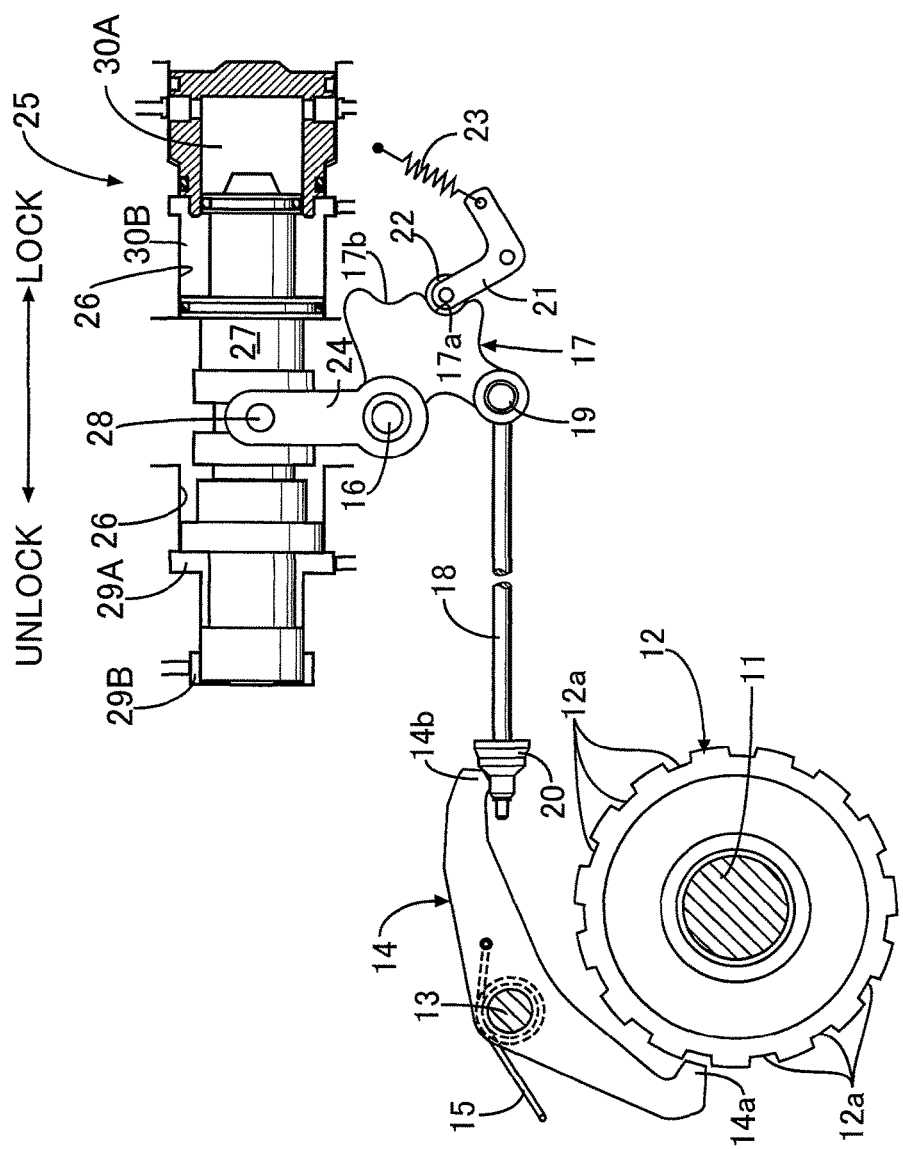
FIG. 1 is a diagram showing the structure of a parking lock device. (first embodiment)

12 Parking gear
25 Hydraulic actuator
31 Hydraulic circuit
29A First locking oil chamber
29B Second locking oil chamber
30A First unlocking oil chamber
30B Second unlocking oil chamber
32A Solenoid valve (second solenoid valve)
32B Solenoid valve (third solenoid valve)
32C Solenoid valve (first solenoid valve)
32D Solenoid valve (first solenoid valve)
37 First accumulator (accumulator)
38 Second accumulator (accumulator)
40 Torque converter (starting mechanism)
40a Lockup clutch
41 Hydraulic brake (hydraulic engagement device)

MODE FOR CARRYING OUT THE INVENTION

An embodiment of the present invention is explained below by reference to FIG. 1 to FIG. 7.
First Embodiment The structure of a parking lock device is now explained by reference to FIG. 1.

A parking gear 12 is fixed to a gear shaft 11 of an automatic transmission, and a latching claw 14a provided at one end of a parking pawl 14 pivotably supported on a support shaft 13 is urged by a spring 15 in a direction in which it disengages from tooth grooves 12a of the parking gear 12. One end of a parking rod 18 is pivotably supported, via a pin 19, on a detent plate 17 pivotably supported on a support shaft 16, and a cone-shaped cam 20 provided at the other end of the parking rod 18 abuts against a cam follower 14b provided at the other end of the parking pawl 14. A detent roller 22 provided at one end of a swingable arm 21 is urged by a spring 23 in a direction in which it engages with either one of two recess portions 17a and 17b of the detent plate 17. A link 24 pivotably supported on the support shaft 16 and swinging integrally with the detent plate 17 is connected to a hydraulic actuator 25.

The hydraulic actuator 25 includes a piston 27 slidably fitted into a cylinder 26, and the link 24 is connected to the piston 27 via a pin 28. Formed on the left end side of the cylinder 26 are a first locking oil chamber 29A and a second locking oil chamber 29B for driving the piston 27 in a direction (rightward) in which parking lock is operated, and formed on the right end side of the cylinder 26 are a first unlocking oil chamber 30A and a second unlocking oil chamber 30B for driving the piston 27 in a direction (leftward) in which parking lock is released.

When a hydraulic pressure is supplied to the first locking oil chamber 29A and the second locking oil chamber 29B, the piston 27 moves rightward, the movement of the piston 27 pushes up the cam follower 14b of the parking pawl 14 via the link 24, the detent plate 17, the parking rod 18, and the cam 20, the parking pawl 14 swings against the resilient force of the spring 15 to make the latching claw 14a engage with one of the tooth grooves 12a of the parking gear 12, and parking lock is operated to thus suppress movement of the vehicle. In the operated state of parking lock, the detent roller 22 engages with the recess portion 17b of the detent plate 17, thus maintaining the state in a stable manner.

On the other hand, when the hydraulic pressure is supplied to the first unlocking oil chamber 30A and the second unlocking oil chamber 30B, the piston 27 moves leftward, the latching claw 14a of the parking pawl 14 disengages from the tooth groove 12a of the parking gear 12, and parking lock is released to thus enable the vehicle to move. In the released state of parking lock, the detent roller 22 engages with the recess portion 17a of the detent plate 17, thus maintaining the state in a stable manner.

Figure 2:
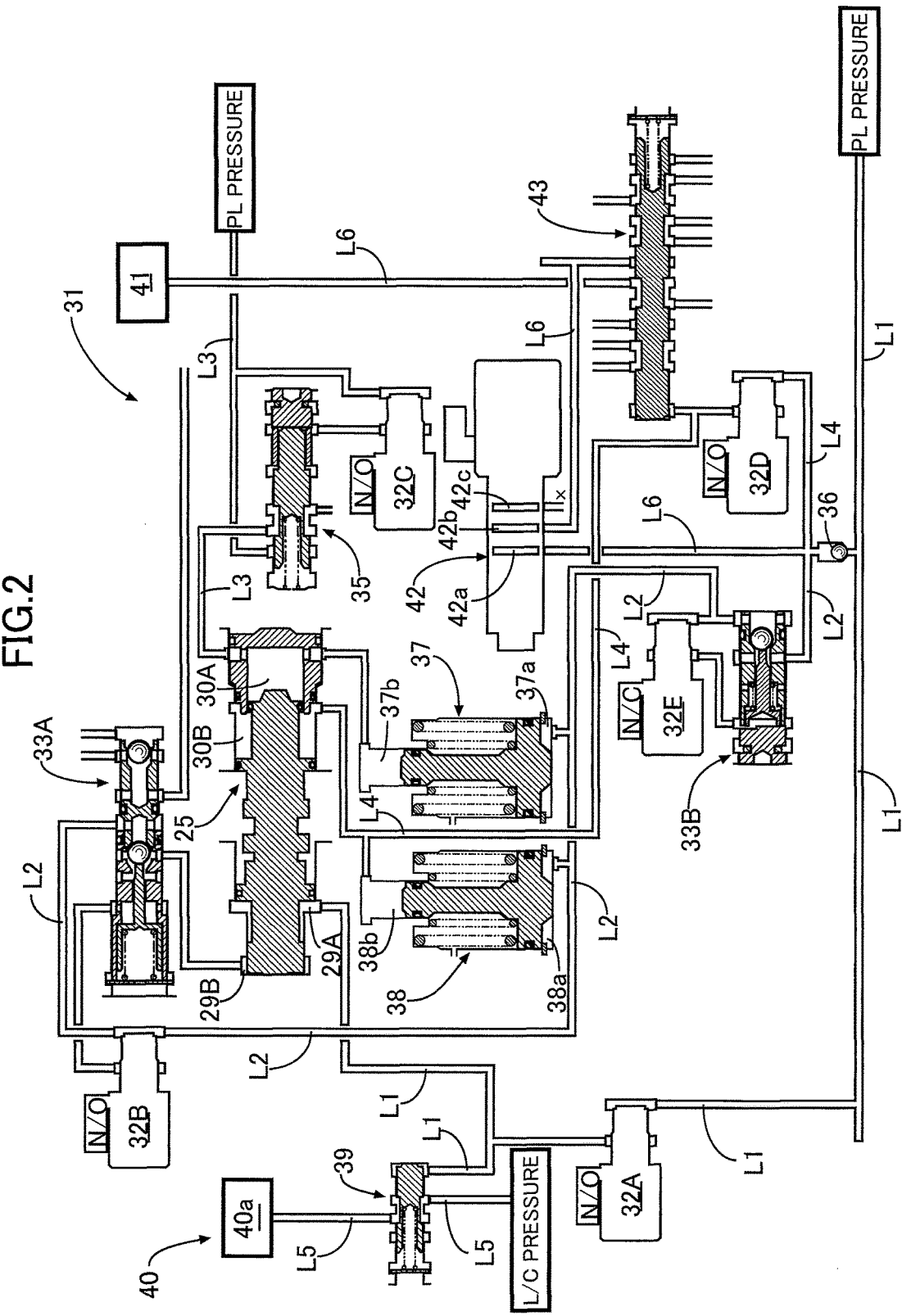
FIG. 2 is a hydraulic circuit diagram of the parking lock device, (first embodiment)

A hydraulic circuit 31 for controlling the operation of the hydraulic actuator 25 is now explained by reference to FIG. 2.

The hydraulic circuit 31 includes an ON/OFF type solenoid valve 32A that supplies to the first locking oil chamber 29A of the hydraulic actuator 25 a line pressure supplied to an oil passage L1 from a hydraulic pump, which is not illustrated, forming the hydraulic pressure supply source of the present invention, and an ON/OFF type solenoid valve 32B that supplies to the second locking oil chamber 29B of the hydraulic actuator 25 a line pressure of an oil passage L2 connected to the downstream side of the oil passage L1 via a check valve 36. By being open the solenoid valve 32A supplies the line pressure directly to the first locking oil chamber 29A, but by being open the solenoid valve 32B opens a first ball valve 33A. The solenoid valve 32A and the solenoid valve 32B are both of a normally open type.

Furthermore, the hydraulic circuit 31 includes an ON/OFF type solenoid valve 32C that supplies a line pressure of an oil passage L3 to the first unlocking oil chamber 30A of the hydraulic actuator 25, and an ON/OFF type solenoid valve 32D that supplies a line pressure of an oil passage L4 on the downstream of the check valve 36 to the second unlocking oil chamber 30B of the hydraulic actuator 25. By being open the solenoid valve 32D supplies the line pressure directly to the second unlocking oil chamber 30B, but by being open the solenoid valve 32C moves a spool of a parking inhibit valve 35 leftward to thus supply the line pressure to the first unlocking oil chamber 30A and by being closed it moves the spool rightward to thus drain the line pressure of the first unlocking oil chamber 30A. The solenoid valve 32C and the solenoid valve 32D are both of a normally open type.

Connected to the oil passage L2 between the check valve 36 and the solenoid valve 32B are a pressure storage chamber 37a of a first accumulator 37 and a pressure storage chamber 38a of a second accumulator 38, a back chamber 37b of the first accumulator 37 communicating with the first unlocking oil chamber 30A, and a back chamber 38b of the second accumulator 38 communicating with the second unlocking oil chamber 30B. Disposed between the check valve 36 and the first accumulator 37 and second accumulator 38 is a second ball valve 33B that is opened and closed by an ON/OFF type solenoid valve 32E. By being open the solenoid valve 32E increases the flow rate of oil by opening the second ball valve 33B. The solenoid valve 32E is of a normally closed type.

A lockup clutch shift valve 39 is connected to the oil passage L1 on the downstream of the solenoid valve 32A, and the lockup clutch pressure of an oil passage L5 is supplied to a lockup clutch 40a of a torque converter 40, which is a starting mechanism, via the lockup clutch shift valve 39.

Furthermore, a hydraulic brake 41, which is a hydraulic engagement device for shift change, is connected to an oil passage L6 on the downstream side of the check valve 36, and a linear solenoid valve 42 and a brake cut valve 43 are disposed in the oil passage L6. The brake cut valve 43 is driven to open and close by the solenoid valve 32D. The linear solenoid valve 42 includes an in port 42a, an out port 42b, and a drain port 42c, and it is thereby possible to regulate the hydraulic pressure inputted via the in port 42a and output it via the out port 42b or to drain via the drain port 42c the hydraulic pressure inputted via the in port 42a.

The operation of the embodiment of the present invention having the above arrangement is now explained.

As shown in FIG. 3, when the shift lever is operated to a D range or an R range and the vehicle is traveling in a predetermined gear position, the line pressure generated by the hydraulic pump driven by the engine is transmitted to the oil passage L1 and the oil passage L3, and the hydraulic pressure of the oil passage L1 passes through the check valve 36 and is transmitted to the oil passage L2, the oil passage L4, and the oil passage L6. When the normally closed solenoid valve 32E is energized and opened, the second ball valve 33B is opened in response thereto, the line pressure is supplied to the oil passage L2, and the hydraulic pressure is stored under pressure in the pressure storage chambers 37a and 38a of the first accumulator 37 and the second accumulator 38.

The normally open solenoid valve 32C and solenoid valve 32D are de-energized and open, the spool of the parking inhibit valve 35 moves leftward due to the solenoid valve 32C being opened, the line pressure of the oil passage L3 is thus transmitted to the first unlocking oil chamber 30A of the hydraulic actuator 25 via the parking inhibit valve 35, and due to the solenoid valve 32D being open the line pressure of the oil passage L4 is transmitted to the second unlocking oil chamber 30B of the hydraulic actuator 25.

On the other hand, the normally open solenoid valve 32A and solenoid valve 32B are energized and close; due to the solenoid valve 32A being closed the oil of the first locking oil chamber 29A of the hydraulic actuator 25 is drained from the solenoid valve 32A via the arrowed path, due to the solenoid valve 32B being closed the first ball valve 33A closes, and the oil of the second locking oil chamber 29B of the hydraulic actuator 25 is thereby drained from the first ball valve 33A via the arrowed path. As a result, the piston 27 of the hydraulic actuator 25 moves leftward and releases the parking lock.

Although the flow rate of oil that can pass through the solenoid valve 32B is relatively small, since the flow rate of oil that can pass through the first ball valve 33A opened and closed by the solenoid valve 32B is relatively large, due to the first ball valve 33A being present therebetween the operating responsiveness of the hydraulic actuator 25 can be enhanced.

As described above, when the vehicle is traveling, due to the solenoid valve 32A and the solenoid valve 32B being closed and the solenoid valve 32C and the solenoid valve 32D being open, the hydraulic actuator 25 is operated to an unlock position, thus enabling the parking lock to be released. In this arrangement, since the hydraulic actuator 25 includes two locking oil chambers, that is, the first locking oil chamber 29A and the second locking oil chamber 29B, and two unlocking oil chambers, that is, the first unlocking oil chamber 30A and the second unlocking oil chamber 30B, even if one of the solenoid valve 32C and the solenoid valve 32D seizes to a valve-closed state and the hydraulic pressure is not supplied to the first unlocking oil chamber 30A or the second unlocking oil chamber 30B, or even if one of the solenoid valve 32A and the solenoid valve 32B seizes to a valve-open state and the hydraulic pressure is supplied to the first locking oil chamber 29A or the second locking oil chamber 29B, the hydraulic actuator 25 can be operated to an unlock position without problems, thus ensuring that there is redundancy.

The solenoid valve 32C opens at a first predetermined gear position, the solenoid valve 32D opens at a second predetermined gear position, and the first predetermined gear position and the second predetermined gear position partially overlap each other. Therefore, there is a case in which the line pressure is supplied only to the first unlocking oil chamber 30A according to a gear position that is established at that time, a case in which the line pressure is supplied only to the second unlocking oil chamber 30B, and a case in which the line pressure is supplied to both the first unlocking oil chamber 30A and the second unlocking oil chamber 30B; in any of these cases the piston 27 of the hydraulic actuator 25 moves leftward to thus release the parking lock, and there are no problems. Since the line pressure is supplied to both the first unlocking oil chamber 30A and the second unlocking oil chamber 30B at the overlapping gear position, even if the solenoid valve 32C or the solenoid valve 32D malfunctions and the supply of line pressure is discontinued, the parking lock is retained in an operation released state, thus enhancing the redundancy.

As shown in FIG. 4, when the vehicle stops with the shift lever operated to a P range while the engine is running, the solenoid valve 32A and the solenoid valve 32B are de-energized and open, and the solenoid valve 32C and the solenoid valve 32D are energized and close. Due to the solenoid valve 32A being open the line pressure of the oil passage L1 is transmitted to the first locking oil chamber 29A of the hydraulic actuator 25, and due to the solenoid valve 32B being open the first ball valve 33A opens and the line pressure of the oil passage L2 is transmitted to the second locking oil chamber 29B of the hydraulic actuator 25.

On the other hand, due to the solenoid valve 32C being closed, the oil of the first unlocking oil chamber 30A of the hydraulic actuator 25 is drained via the arrowed path from the parking inhibit valve 35, and due to the solenoid valve 32D being closed the oil of the second unlocking oil chamber 30B of the hydraulic actuator 25 is drained from the solenoid valve 32D via the arrowed path. As a result, the piston 27 of the hydraulic actuator 25 moves rightward to thus operate the parking lock.

As described above, when the shift lever is put into the P range while the engine is running, the solenoid valve 32A and the solenoid valve 32B are opened, the solenoid valve 32C and the solenoid valve 32D are closed, and the hydraulic actuator 25 can be operated to a lock position. In this arrangement, since the hydraulic actuator 25 includes two locking oil chambers, that is, the first locking oil chamber 29A and the second locking oil chamber 29B, and two unlocking oil chambers, that is, the first unlocking oil chamber 30A and the second unlocking oil chamber 30B, even if one of the solenoid valve 32C and the solenoid valve 32D seizes to a valve-open state and the hydraulic pressure is supplied to the first unlocking oil chamber 30A or the second unlocking oil chamber 30B, or even if one of the solenoid valve 32A and the solenoid valve 32B seizes to a valve-closed state and no hydraulic pressure is supplied to the first locking oil chamber 29A and the second locking oil chamber 29B, the hydraulic actuator 25 is operated to a lock position without problems, thus ensuring that there is redundancy.

As shown in FIG. 5, when the shift lever is operated to the P range and the ignition is turned OFF, the engine stops and the line pressure thereby disappears, but in accordance with the present embodiment the parking lock device can be operated without problems by the hydraulic pressure stored under pressure in the first accumulator 37 and the second accumulator 38.

That is, due to the ignition being turned OFF the normally open solenoid valve 32A, solenoid valve 32B, solenoid valve 32C, and solenoid valve 32D are all de-energized and open, and the normally closed solenoid valve 32E is de-energized and closed. Even if the line pressure disappears, due to the solenoid valve 32E being closed the second ball valve 33B closes, and the hydraulic pressure stored under pressure in the first accumulator 37 and the second accumulator 38 is retained without leakage.

Due to the solenoid valve 32B being open the hydraulic pressure of the first accumulator 37 and of the second accumulator 38 is transmitted to the second locking oil chamber 29B of the hydraulic actuator 25 via the opened first ball valve 33A, whereas due to the solenoid valve 32C being open the oil of the first unlocking oil chamber 30A of the hydraulic actuator 25 is drained from the parking inhibit valve 35 via the arrowed path, and due to the solenoid valve 32D being open the oil of the second unlocking oil chamber 30B of the hydraulic actuator 25 is drained from the solenoid valve 32D via the arrowed path. As a result, the piston 27 of the hydraulic actuator 25 moves rightward to thus operate the parking lock.

As described above, even if the line pressure disappears due to the shift lever being operated to the P range and the ignition being turned OFF, the parking lock device can be operated without problems by the hydraulic pressure stored under pressure in the first accumulator 37 and the second accumulator 38.

The vehicle of the present embodiment can be subjected to idling stop control, and the line pressure disappears due to the engine E stopping at a time of a temporary stop such as when waiting for a traffic light. During this idling stop control, as shown in FIG. 6, the normally closed solenoid valve 32E is de-energized and closes, in response thereto the second ball valve 33B closes, and the hydraulic pressure stored under pressure in the first accumulator 37 and the second accumulator 38 is thereby retained without leakage. Furthermore, due to the line pressure disappearing, the hydraulic pressure of the first unlocking oil chamber 30A and the second unlocking oil chamber 30B of the hydraulic actuator 25 also disappears, and due to engagement between the detent plate 17 and the detent roller 22 the parking lock is maintained in the operation released state.

Since the line pressure does not immediately rise even when the engine starts when recovering from idling stop control, the hydraulic pressure cannot be supplied to the hydraulic brake 41, which is a hydraulic engagement device necessary for starting, and there is a possibility that smooth starting will be inhibited. However, in accordance with the present embodiment, the hydraulic brake 41 can be operated without delay by the hydraulic pressure of the first accumulator 37 and the second accumulator 38 retained during idling stop control.

That is, as shown in FIG. 7, when the second ball valve 33B is opened by energizing and opening the solenoid valve 32E at the same time as recovering from idling stop control, the hydraulic pressure stored under pressure in the first accumulator 37 and the second accumulator 38 is transmitted from the oil passage L2 to the oil passage L4 and the oil passage L6 via the second ball valve 33B. In this arrangement, since the solenoid valve 32D disposed in the oil passage L4 is de-energized and open, the spool of the brake cut valve 43 moves rightward. Therefore, opening the linear solenoid valve 42 disposed in the oil passage L6 at a predetermined degree of opening enables the hydraulic pressure stored under pressure in the first accumulator 37 and the second accumulator 38 to be supplied to the hydraulic brake 41 and the vehicle to be started promptly.

Although the flow rate of oil that can pass through the solenoid valve 32E is relatively small, since the flow rate of oil that can pass through the second ball valve 33B, which is opened and closed by the solenoid valve 32E, is relatively large, it is possible by disposing the second ball valve 33B therebetween to enhance the responsiveness of supply of the hydraulic pressure from the first accumulator 37 and the second accumulator 38, thereby enabling the hydraulic brake 41 to be promptly engaged.

In the explanation above, the operation of the hydraulic brake 41 when recovering from idling stop control is explained, but the hydraulic brake 41 can also be controlled during normal traveling of the vehicle by operating the brake cut valve 43 with the solenoid valve 32D. When the solenoid valve 32D is closed in order to move the spool of the brake cut valve 43 leftward to thus cut off communication between the linear solenoid valve 42 and the hydraulic brake 41, the supply of hydraulic pressure to the second unlocking oil chamber 30B of the hydraulic actuator 25 is cut off, but since the hydraulic actuator 25 is retained at an unlock position with the hydraulic pressure supplied to the first unlocking oil chamber 30A, there is no possibility that parking lock will be operated.

Furthermore, in accordance with the present embodiment, the solenoid valve 32A for operation of the hydraulic actuator 25 is also used for operation of the lockup clutch 40a of the torque converter 40. That is, since the solenoid valve 32A is closed when the vehicle is traveling as shown in FIG. 3, the spool of the lockup clutch shift valve 39 moves rightward, and the lockup clutch pressure is supplied to the lockup clutch 40a of the torque converter 40. When in this state the solenoid valve 32A is de-energized and opened, the spool of the lockup clutch shift valve 39 operates to drain the hydraulic pressure of the lockup clutch 40a, and the lockup clutch 40a can thereby be disengaged.

When the solenoid valve 32A is opened, the line pressure is supplied to the first locking oil chamber 29A of the hydraulic actuator 25, but since the line pressure is being supplied to both the first unlocking oil chamber 30A and the second unlocking oil chamber 30B at this point, even if the line pressure is supplied to the first locking oil chamber 29A, the piston 27 of the hydraulic actuator 25 does not move to the lock position, and there is no possibility that the parking lock will be operated.

As described above, in accordance with the present embodiment, since the solenoid valve 32A and the solenoid valve 32D, which control the operation of the hydraulic actuator 25, are also used for control of the lockup clutch 40a of the torque converter 40 and control of the hydraulic brake 41 respectively, it is possible to reduce the number of solenoid valves to thus simplify the structure of the hydraulic circuit 31 and, moreover, since the first accumulator 37 and the second accumulator 38 are used not only for operation of the parking lock but also for operation of the hydraulic brake 41, which is a hydraulic engagement device when recovering from idling stop control, it is possible to reduce the number of accumulators to thus further simplify the structure of the hydraulic circuit 31.

An embodiment of the present invention is explained above, but the present invention may be modified in a variety of ways as long as the modifications do not depart from the spirit and scope thereof.

For example, the number of solenoid valves for locking (the second solenoid valve and the third solenoid valve) of the present invention is not limited to the two of the embodiment, that is, the solenoid valve 32A and the solenoid valve 32B, and may be one or three or more.

Furthermore, the number of solenoid valves for unlocking (the first solenoid valve) of the present invention is not limited to the two of the embodiment, that is, the solenoid valve 32C and the solenoid valve 32D, and may be one or three or more.

Moreover, in the embodiment the solenoid valve 32A is also used as a solenoid valve for supplying the hydraulic pressure to the lockup clutch 40a of the torque converter 40, but the solenoid valve 32B may also be used therefor, or the solenoid valve 32A (or the solenoid valve 32B) may also be used as a solenoid valve for supplying the hydraulic pressure to the hydraulic engagement device. That is, the solenoid valve 32A or the solenoid valve 32B may also be used as a solenoid valve for supplying the hydraulic pressure to a starting mechanism or as a solenoid valve for supplying the hydraulic pressure to any one of a plurality of hydraulic engagement devices.

Furthermore, the hydraulic engagement device of the present invention is not limited to the hydraulic brake 41 of the embodiment and may be another hydraulic engagement device such as a hydraulic clutch.

Moreover, the starting mechanism of the present invention is not limited to the torque converter 40 of the embodiment and may be another starting mechanism such as a starting clutch.

The invention claimed is:

1. A vehicular parking lock device in which an automatic transmission that comprises a starting mechanism and a plurality of hydraulic engagement devices and changes a speed of a driving force from a drive source and outputs the driving force includes a hydraulic actuator that can restrain rotation of a parking gear connected to a wheel and a hydraulic circuit that controls operation of the hydraulic actuator, wherein the hydraulic circuit comprises:

a first solenoid valve that supplies a line pressure to one end of the hydraulic actuator in order to drive the hydraulic actuator to a parking lock release position;

an accumulator in which a pressure is stored by the line pressure;

a second solenoid valve that supplies the line pressure to the other end of the hydraulic actuator in order to drive the hydraulic actuator to a parking lock operation position; and a third solenoid valve that supplies a hydraulic pressure from the accumulator to said other end of the hydraulic actuator in order to drive the hydraulic actuator to the parking lock operation position, wherein the first solenoid valve or the second solenoid valve also functions as a solenoid valve that supplies the hydraulic pressure to the starting mechanism or a solenoid valve that supplies the hydraulic pressure to any one of the plurality of hydraulic engagement devices.

2. The vehicular parking lock device according to claim 1, wherein the drive source is an engine that is subjected to idling stop control at a time of deceleration of the vehicle, and the accumulator also functions as an accumulator that supplies the hydraulic pressure to any one of the plurality of hydraulic engagement devices when recovering from idling stop control.

3. The vehicular parking lock device according to claim 2, wherein the first solenoid valve comprises two solenoid valves, and a forward travel gear position first range established in the automatic transmission when one thereof supplies the line pressure to one end of the hydraulic actuator and a forward travel gear position second range established in the automatic transmission when the other thereof supplies the line pressure to said one end of the hydraulic actuator at least partially overlap one another.

4. The vehicular parking lock device according to claim 2, wherein the starting mechanism is a torque converter equipped with a lockup clutch, and the second solenoid valve also functions as a solenoid valve that supplies the hydraulic pressure to the lockup clutch.

5. The vehicular parking lock device according to claim 1, wherein the starting mechanism is a torque converter equipped with a lockup clutch, and the second solenoid valve also functions as a solenoid valve that supplies the hydraulic pressure to the lockup clutch.

6. The vehicular parking lock device according to claim 5, wherein the first solenoid valve comprises two solenoid valves, and a forward travel gear position first range established in the automatic transmission when one thereof supplies the line pressure to one end of the hydraulic actuator and a forward travel gear position second range established in the automatic transmission when the other thereof supplies the line pressure to said one end of the hydraulic actuator at least partially overlap one another.

7. The vehicular parking lock device according to claim 6, wherein provided on said other end side of the hydraulic actuator are a first locking oil chamber to which the hydraulic pressure is supplied via the second solenoid valve and a second locking oil chamber to which the hydraulic pressure is supplied via the third solenoid valve , and provided on said one end side of the hydraulic actuator are a first unlocking oil chamber to which the hydraulic pressure is supplied via one of the first solenoid valves and a second unlocking oil chamber to which the hydraulic pressure is supplied via the other one of the first solenoid valves.

8. The vehicular parking lock device according to claim 1, wherein the first solenoid valve comprises two solenoid valves, and a forward travel gear position first range established in the automatic transmission when one thereof supplies the line pressure to one end of the hydraulic actuator and a forward travel gear position second range established in the automatic transmission when the other thereof supplies the line pressure to said one end of the hydraulic actuator at least partially overlap one another.

9. The vehicular parking lock device according to claim 8, wherein provided on said other end side of the hydraulic actuator are a first locking oil chamber to which the hydraulic pressure is supplied via the second solenoid valve and a second locking oil chamber to which the hydraulic pressure is supplied via the third solenoid valve , and provided on said one end side of the hydraulic actuator are a first unlocking oil chamber to which the hydraulic pressure is supplied via one of the first solenoid valves and a second unlocking oil chamber to which the hydraulic pressure is supplied via the other one of the first solenoid valves.

10. The vehicular parking lock device according to claim 1, wherein the first to third solenoid valves are of a normally open type.

11. The vehicular parking lock device according to claim 1, wherein the first, second and third solenoid valves are arranged in respective oil passages of the hydraulic circuit, which oil passages are formed branched off one another at downstream portions thereof.

\* \* \* \* \*